Jan. 13, 1953   M. R. NORTON   2,624,971
FISH LURE
Filed Oct. 19, 1950
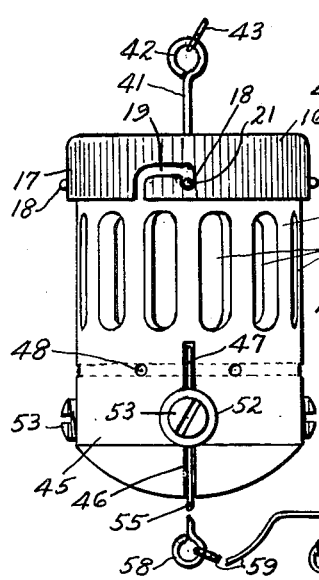
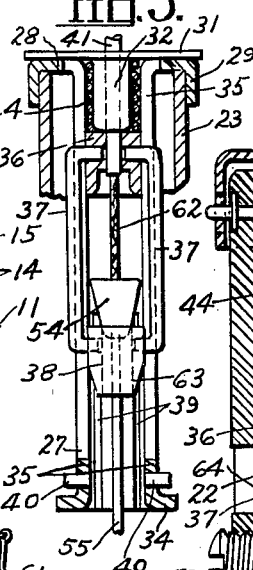
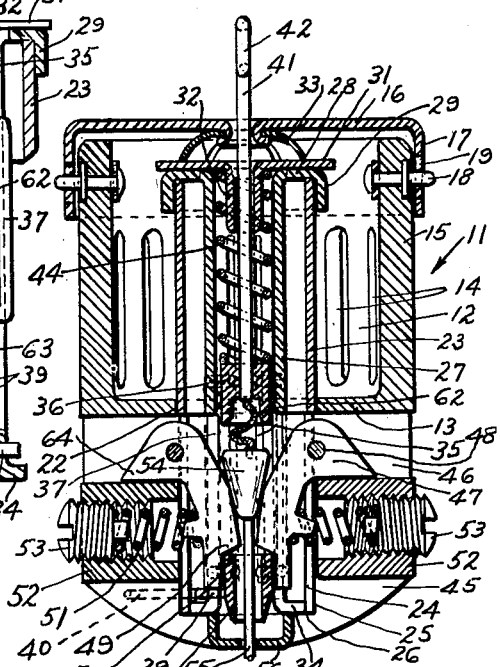
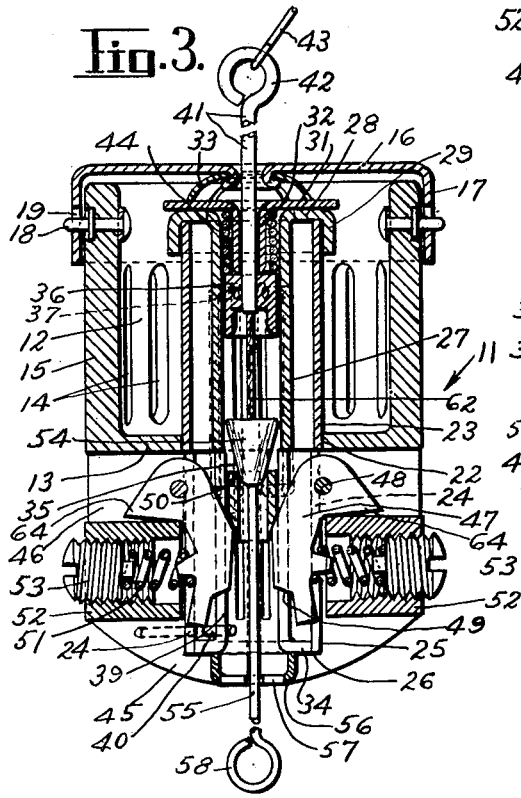
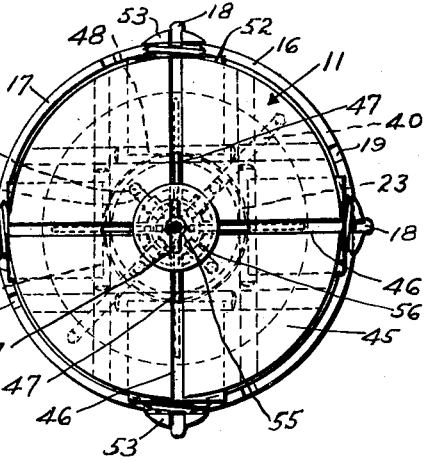
INVENTOR
*Merritt R. Norton.*
BY
*Walter S. Edwards.*
ATTORNEY Patented Jan. 13, 1953

2,624,971

UNITED STATES PATENT OFFICE 2,624,971

FISH LURE

Merritt R. Norton, West Haven, Conn.

Application October 19, 1950, Serial No. 190,999

5 Claims. (Cl. 43—16)

This invention relates to fish lures and more particularly to a fish lure in which is combined the advantages of the provision of a floatable container for lure material, means to hold bait, and means to cause rapid movement of a hook, or hooks, to insure the catching of a fish.

In the art of fish catching it is often desirable to provide lure material about the bait to lure fish into close proximity with a baited hook. It is also desirable, in many instances to maintain the baited hook, or hooks, at a certain depth in the water. Considerable dexterity is required in using the average float to take up the slack in the line so as to create a quick pull on the line leading from the float to the baited hook and catch the fish which has attacked the bait. It has been found to be of advantage to provide a fish lure container, a float, and means to create an abrupt pull on the baited hook, or hooks, when a fish attacks the bait on the hook, or otherwise becomes attached to a hook.

One object of this invention is to provide a fish lure having combined in its structure the elements of a lure material container, a float and means to create an abrupt pull on the baited hook to insure the catching of fish.

Other objects are to provide in such a fish lure, an openable hollow float wherein fish lure material may be placed and which may exude therefrom, and a settable trigger mechanism adapted to have a hook, or hooks, attached to and depending therefrom, whereby the hook will be given an abrupt pull when a fish attacks the hook, or bait thereon.

Still another object is to provide a fish lure of the above nature and structure which may be readily disassembled and reassembled for filling, cleaning and/or replacement of parts.

A further object is to provide a fish lure which will be relatively inexpensive to manufacture, simple in construction and operation, of pleasing appearance, and which is very efficient and durable in use.

With these and other objects in view, which will appear as the description proceeds, there has been illustrated in the accompanying drawings one form of fish lure in which the features and principles of this invention may be conveniently and practically embodied.

In the drawings:

Figure 1 is an elevational view of a fish lure embodying the features and principles of this invention;

Figure 2 is an enlarged longitudinal sectional view of the fish lure shown in Figure 1 with the settable fish hook pulling mechanism in set position;

Figure 3 is a view similar to Figure 2 but in which the fish hook pulling mechanism has been released;

Figure 4 is a bottom plan view of the fish lure of this invention; and

Figure 5 is a lengthwise section through a part of the fish lure to show its specific construction.

Referring now to the drawings wherein like reference numerals designate like parts throughout the several views, the reference numeral 11 denotes the casing of a float, of buoyant material, generally cylindrical in shape, and having a cylindrical opening 12 in its upper portion open at its top and substantially closed at its bottom by a wall 13. A series of elongated holes 14 are provided in the peripheral wall 15. A cover 16 is provided for the open upper end of the casing 11, which cover has a peripheral flange 17 extending over and downwardly along the side wall 15. The cover 16 is detachably secured to the casing 11 by pins 18 extending outwardly from the wall 14 which enter bayonet slots 19 in the flange 17, and are engaged, against turning upon the casing 11, in cross-grooves 21.

The wall 13 has a central opening 22 therein through which a sleeve 23 extends both above and below the bottom wall 13. The portion of the sleeve 23 above the bottom wall 13 has solid walls while the portion thereof below the wall 13 is slotted lengthwise thereof, four slots 24 being provided equally spaced peripherally about the sleeve. The slotted lower end of the sleeve 23 extends downwardly in the casing 11 through an opening 25 which is an extension of the opening 22 and terminates at 26 spaced upwardly from the bottom of the casing 11. The upper end of the sleeve 23 terminates short of the cover 16 being spaced downwardly therefrom. The sleeve 23 is cemented, or otherwise secured to the casing 11 at the bottom wall 13.

A tube 27 extends downwardly through the sleeve 23 being supported from the upper end of said sleeve 23 by a flange 28 extending outwardly and peripherally about the upper end of the tube 27. A downwardly extending peripheral flange 29 is provided about the outer edge of the flange 28 and laps over the upper end of the sleeve 23. A disc 31, having a central tubular stem 32 extending downwardly therefrom, is seated upon the flange 28 of the tube 27. The tube 27 and disc 31 are firmly held downwardly upon the upper end of the sleeve 23 by an inverted cup-shaped split disc spring 33, which is attached to the cover 16. The spring 33 reacts between the disc 31 and the cover 16 to also maintain the pins 18 in the grooves 21 to lock the cover 16 in place.

The tube 27 extends downwardly through the sleeve 23 and has an outwardly extending peripheral flange 34 at its lower end which is rigidly secured to the sleeve 23. The tube 27 is provided with lengthwise slots 35, four being shown. The slots 35 extend upwardly from adjacent the flanged bottom end of the tube 27 to and through the upper end of said tube 27. A plunger 36 is slidably disposed in the tube 27 and has rods 37, four in this instance, secured thereto and extending outwardly therefrom through the slots 35 in the tube 27 and then downwardly and are extended inwardly into, and secured to, a short sleeve 38. The short sleeve 38 is also slidable in the tube 27. The lower end of the tube 27 below the wall 13 is provided with slots 39 which transversely align with the slots 24 in the sleeve 23. Pins 40 extending through the casing 11 and the sleeve 23 and into the tube 27 hold these parts together and to the casing 11 in slot aligning position. By means of the rods 37, the plunger 36 and the short sleeve 38 are attached together and will move in unison in the tube 27. A length of wire 41 is secured to the plunger 36 and extends upwardly therefrom through the hollow stem 32 of the disc 31, and through the cover 16. The wire 41 has a loop 42 at its upper end to which the usual fish line 43 may be secured. Thus the wire 41 will move in unison with the plunger 36 and short sleeve 38. A coiled tension spring 44, spot welded at one end to the disc 31 and spot welded at the other end to the plunger 36, constantly urges the plunger 36 upwardly toward the disc 31 and thus urges the wire 41 and the short sleeve 38 upwardly.

The lower end 45 of the casing 11 has cross slots 46, two being shown, which extend entirely across the casing 11 in under the wall 13. The slots 46 are in transverse alignment with the slots 24 and 39 in the sleeve 23 and in the tube 27 respectively. A trigger 47 is pivotally mounted in the casing 11, to swing in each slot 46, by pins 48. Each trigger 47 has a catch shoulder 49 provided thereon and adapted to engage the upper end 50 of the short sleeve 38 to hold the same with the plunger 36 and the wire 41 in downwardly disposed position, as shown in Figure 2. Compression springs 51 mounted in bushings 52, extending inwardly from the casing sides in alignment with the slots 46, react between the triggers 47 and set screws 53, screwed one into each bushing to constantly urge the triggers 47 inwardly to position the catch shoulders 49 in short sleeve engaging position. Tension of the springs 51 may be varied by manipulation of the set screws 53.

The upper inner end edges of the triggers 47 are upwardly and outwardly inclined to receive a trigger operating member 54. The member 54 is inverted cone-shaped and has a wire 55 secured to and extending downwardly therefrom through the short sleeve 38 and through a cup-shaped ferrule 56, secured in the bottom end of the casing 11. The ferrule 56 has a slot 57 therein to pass a loop 58 formed on the lower end of the wire 55. The loop 58 is provided to receive a short length of fish line 59 to the end of which a hook, or hooks, 61 is fastened. The trigger operating member 54 is attached to the plunger 36, and the wire 41, by a short length of flexible cable 62, preferably of non-corrosive metal. The lower end 63 of the short sleeve 38 is inverted cone-shaped to facilitate spreading the triggers 47 apart and allow the said sleeve to pass thereby so that its upper end 50 may be engaged by the catch shoulders 49. Each trigger 47 is provided with a stop finger 64, adapted to engage the adjacent bushing 52 to limit the inward swing of the trigger.

After filling the casing 11 with fish lure material, a line 43 is secured to the loop 42 and then the line 59 and hook 61 is secured to the loop 58, see Figure 3, the hook 61 is baited and the wire 41 is pressed downwardly to move the plunger 36 and, through the rods 37, to force the short sleeve 38 downwardly into the position shown in Figure 2. In this position the device is set, the spring 44 being placed under tension, the short sleeve 38 being engaged by the catch shoulders 49, and the member 54 is loosely seated upon the upper inclined edges of the triggers. A fish attacking the baited hook 61 will pull upon the wire 55 causing the member 54 to move downwardly and force the triggers 47 outwardly to release the short sleeve 38, whereupon the spring 44 will abruptly pull upwardly upon the plunger 36 and cause the member 54 and wire 55, with the hook 61, to be abruptly snapped upwardly to impale the fish upon the hook 61. As soon as the device is tripped, as above described, the user will visually note that the same has happened by observing that the wire 41, which may be colored on its upper end, and the loop 42 extend considerably above the casing cover, to signal such a condition. While it is preferred that the float casing 11 be made of buoyant material, it is obvious that it could be constructed, for instance with sealed pockets, to make it buoyant, should it be made of non-buoyant material, such as plastic. For the purpose of this invention a buoyant casing of any form is sufficient.

The fish lure described above is readily disassembled for cleaning, repair, and replacement of parts. By removing the cover 16, the disc 31, spring 44, plunger 36, rods 37, short sleeve 38, wires 41 and 55, and member 54, may be removed vertically from the tube 27 and the casing 11. Removal of springs 51, by unscrewing the set screws 53, will release the triggers 47, and by driving out the pins 48, the triggers may be removed.

While there has been shown and described herein one form of fish lure in which the features and principles of this invention may be conveniently and practically embodied, it is to be understood that they may be embodied in other specific forms without departing from the spirit and essential attributes thereof, and it is therefore desired that the present embodiment be considered in all respects as illustrative and not restrictive, reference being had to the claims rather than to the foregoing to indicate the scope of the invention.

Having thus fully described the invention, what is claimed as new and useful, and for which it is desired to obtain Letters Patent, is:

1. In a fish lure, floatable casing having an internal space in its upper portion to hold lure material and peripherally spaced apart openings leading through said casing side into said space, through which the lure material therein may exude into surrounding water, a member extending upwardly through said casing approximately centrally of said internal space, to the upper end of which a fish line may be attached, said member being slidable longitudinally of said casing, a short sleeve rigidly connected to said member and having a catch surface, catches pivoted to said lower end of said casing and adapted to engage said catch surface, spring means to constantly urge said member upwardly, and fish hook connecting means connected to said member and depending from said casing, said means comprising an element engageable with said catches to disengage the catches from the catch surface of said sleeve when a fish pulls upon said fish hook connecting means.

2. A fish lure comprising, a buoyant casing having an internal space in its upper portion to hold fish lure material and openings in its side through which lure material may exude into surrounding water, a plunger slidable lengthwise in said casing approximately centrally of said internal space, and having a part secured thereto and extending out the upper end of said casing, to be attached to a fish line, a spring urging said plunger in an upward direction, a short sleeve spaced downwardly from said plunger and being rigidly connected thereto to slide with it in said casing, catches pivoted in and to the lower portion of said casing, each having a catch shoulder to engage the upper surface of said sleeve, an element connected to said plunger and movable lengthwise in said casing to engage said catches to swing them to disengage the catch shoulders from said sleeve, and fishhook-connecting means connected to said element and depending therefrom through the lower portion of said casing.

3. A fish lure in accordance with claim 2 and wherein springs to constantly urge said catches toward said sleeve are provided.

4. A fish lure in accordance with claim 3 and wherein said element is connected with said plunger by a short length of flexible cable to be abruptly pulled upwardly when said catches are swung to release said sleeve.

5. A fish lure in accordance with claim 2 and wherein springs to constantly urge said catches toward said sleeve are provided, and wherein said element is connected with said plunger by a short length of flexible cable to be abruptly pulled upwardly when said catches are swung to release said sleeve.

MERRITT R. NORTON.

REFERENCES CITED

The following references are of record in the file of this patent:

UNITED STATES PATENTS

| Number | Name | Date |
|---|---|---|
| 1,614,931 | Pennell | Jan. 18, 1927 |
| 2,465,127 | Stark | Mar. 22, 1949 |

FOREIGN PATENTS

| Number | Country | Date |
|---|---|---|
| 21,499 | Great Britain | Oct. 6, 1903 |